March 22, 1932.      H. L. RUSCH ET AL      1,850,085
VISUAL ANNOUNCER
Filed Aug. 1, 1930
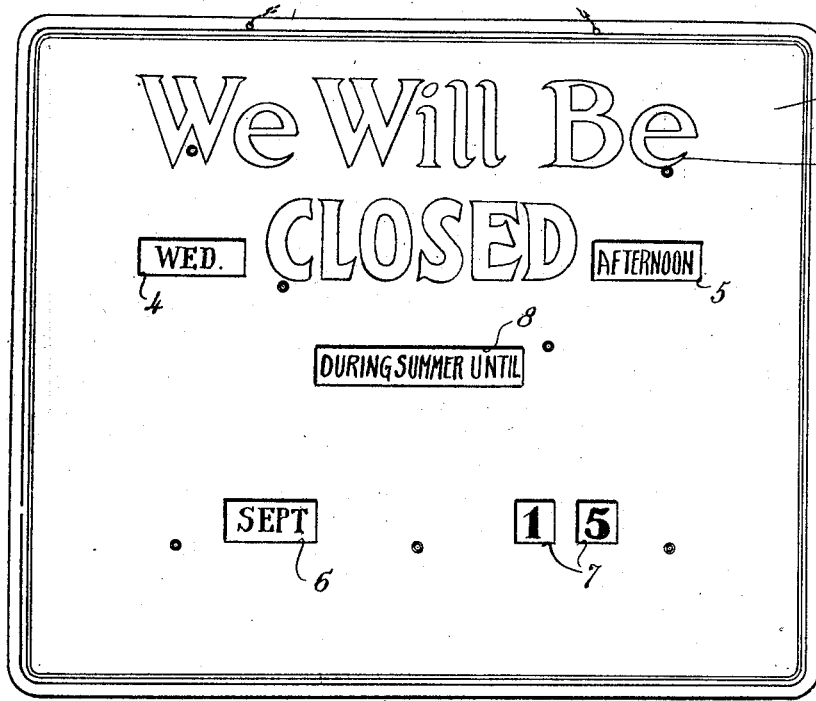
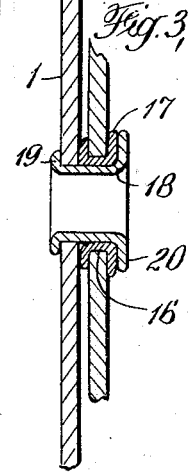
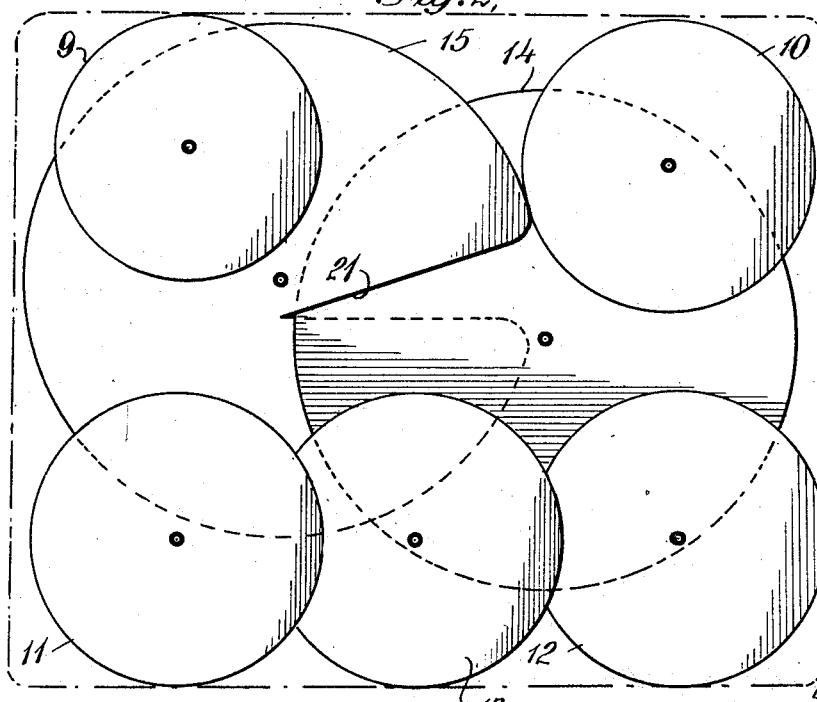
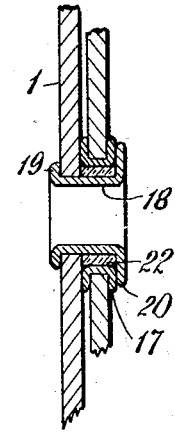
INVENTORS
HUGO L. RUSCH
EDWIN R. LEIBERT
BY
Dallas R. Lamont
ATTORNEY Patented Mar. 22, 1932

1,850,085

UNITED STATES PATENT OFFICE

HUGO L. RUSCH, OF MOUNT VERNON, AND EDWIN R. LEIBERT, OF NEW YORK, N. Y.

VISUAL ANNOUNCER

Application filed August 1, 1930. Serial No. 472,315.

The present invention relates to a visual announcer and has to do particularly with an announcer of this class which can be displayed at a business establishment for the purpose of promulgating information, especially for the purpose of notifying patrons of stores, banks, offices, etc., as to business hours, cessation of business on holidays, and the like.

There are about a dozen nationally observed holidays in this country, exclusive of Sundays, as well as numerous religious holidays, state and local holidays, and others, which may or may not be observed by individuals and business houses. Business establishments such as stores, offices and banks have different practices as to closing hours and frequently observe different practices in this regard at different times. For instance, different business establishments frequently have different practices as to Saturday afternoon and Sunday closing; also an establishment may close at different hours on different days or at different seasons of the year, may be open certain evenings at certain times of the year, may close on one or more afternoons during summer, and the like. It is an object of the present invention to provide a visual announcer which will give out information of this character, in advance, as well as during the time the establishment is closed, thus making the information known to patrons to thereby give them opportunity to adjust their plans accordingly with the result that inconvenience, disappointment and ill will on the part of the patron is avoided and, instead, the patron is afforded a convenience and at the same time the establishment benefits by enhanced good will and business.

It is an object of the invention to provide an announcer of this character which is permanent and can be used indefinitely by merely changing the information revealed to conform to the occasion, which is much less expensive over a period of time than signs painted especially for each occasion, which is neater; more attractive and more business like in appearance; and which can be always at hand and can be put into use at a moment's notice.

Further objects of the invention are the provision of an announcer of the character referred to wherein the information disclosed can be changed to suit the occasion by a simple operation which involves but a few seconds' time; the provision of such an announcer carrying an abundance of information so that it satisfactorily comprehends every announcement which may reasonably be required of it; and the provision of an announcer carrying such great amount of information and which at the same time presents the information logically and simply in a few words so that it can be read and understood quickly merely on casual notice. The announcer is a complete unit in itself; no spare parts likely to be lost are required.

It is a further object of the invention to provide an announcer having the properties and advantages just stated which embodies certain improvements in construction and design which make the article easily operated, durable, attractive in appearance, and adapted to set forth a great variety of information amply sufficient for all occasions.

The above stated and other objects and advantages are attained largely by certain improvements in arrangement, construction, combination and design which are described fully in the following specification and are illustrated in preferred embodiment in the accompanying drawings. In the drawings, Figure 1 is a face view of a visual announcer embodying the invention; Figure 2 is a face view of the operating parts of the announcer, the face plate being removed; and Figures 3 and 4 are views showing details of construction.

Referring to the drawings, 1 indicates the plate which constitutes the principal visible portion of the announcer and serves as a support for the other parts of the article. The plate 1 is preferably of metal, as for instance etched copper bronze which gives the article a rich substantial appearance so that it adds to rather than detracts from the appearance of the place in which it is displayed. The body of the plate may, for instance, be done in a dark color with a natural metal border, as indicated at 2, and with the lettering 3, which appears on the plate, also done in natural metal color. The article is of substantial strength and weight so that it will not flutter or tear in a draft or gust of wind. The article has the rich appearance of a wood or metal plaque which constitutes a part of the furnishing of the place as distinguished from a temporary card or sign.

In the embodiment here shown the announcer carries the permanent inscription "We will be closed" arranged on the plate 1 as shown in smooth letters of natural metal color on a darker grained background. At the left of the permanent inscription a sight opening 4 is provided and at the right a like sight opening 5 is provided. These two openings reveal respectively the day which the announcement affects and also the specific time of the day, as shown. Toward the lower portion of plate 1 at the left another sight opening 6 is provided to announce the month, and opposite opening 6 at the right additional sight openings 7 are provided to disclose the day of the month, as shown.

Beneath the permanent inscription and located generally centrally with respect to the previously mentioned sight openings a somewhat larger central sight opening 8 is provided, the purpose of this opening being to announce the character of the day or time during which cessation of business is effective. The opening 8 is given the position of prominence purposely to attract the attention of the reader to give him, by direct statement or inference, the reason for closing. This feature of the announcer is important in that it draws the attention of the reader unconsciously to the habit or custom which furnishes a reason for the closing of business and thus announces the information to him in such manner as not to offend. The sight openings 4, 5, 6 and 7 arranged around the central opening 8 have the effect of furnishing the specific information as to day of the week, time of day and date which are desirable in fixing the information in the mind of the reader. One of the principal values of the present invention is that its attractive permanent appearance and the manner in which the information is presented accomplish an announcement of the desired information to the patron without arousing any feeling of resentment or offense. It has been found that these factors are of the utmost importance in securing the best effect from the announcer.

The information which is presented through the sight openings of the announcer is lettered or printed on discs operating behind the sight openings. The discs lie substantially flat against the rear side of the face plate 1 and are rotatable about axes perpendicular to the face plate, this construction being fully described below. The reading matter is printed on the discs in such position relative to the axes of the discs that it will be in a normal horizontal line when the discs are rotated to present the printed matter at the sight opening. Figure 2 shows the several discs in position. The information carried on disc 9 is that which appears through sight opening 4 and consists of the names of the days of the week. The information carried on disc 10 is that which appears through sight opening 5 and consists of a series of expressions denoting the particular time of the day at which or during which the cessation of business will be effective. A typical layout of information which may be carried on this disc is as follows: All Day, Until Noon, Afternoon, At 12 M., At 1 P. M., At 5 P. M. The information carried on disc 11 is that which appears through sight opening 6 and consists of the names of the twelve months of the year. The information carried on discs 12 and 13 is that which appears through sight openings 7 and consists of two series of numbers as shown so that the particular day of the month may be indicated at sight openings 7. With this type of presentation, the total amount of information which must be printed on any of the discs operating behind sight openings 4, 5, 6 or 7 is relatively limited and can therefore be printed in letters sufficiently large to be easily readable without requiring large discs. In practical use we have found that a sign about twelve inches in height and about fourteen inches in length is satisfactory. With this size, the discs corresponding to sight openings 4, 5, 6 and 7 may be about five or six inches in diameter. These discs do not extend beyond the edges of the face plate 1 and are therefore entirely out of view when the announcer is on display. The edges of these various discs can, however, be made to closely approach the edges of the face plate 1 so that they are particularly easy and convenient to operate in making the desired setting of the announcer. Also, since the respective discs which are of the same size are located at approximately the four corners of the article, there is no confusion to the operator in determining which disc corresponds to a particular sight opening.

The center opening 8,—the one which is given the position of prominence for the purpose of attracting attention of the reader,—is the one which presents the greatest variety of information. Being more or less centrally located in the face plate 1, the size of the disc 14 which operates in conjunction with it can be large and consequently a greater amount of information can be printed on the disc. The center disc, in a sign of the size above indicated, may conveniently be about eight or nine inches in diameter, or even larger if desired, and can carry from ten to fifteen separate announcements of substantial length printed in letters which are clearly readable at some distance and which are larger than the letters which make their appearance at the other sight openings, the larger lettering at the center opening being in conformity with the position of prominence which this opening occupies.

In addition to the relatively large size of the center disc which is made possible by the manner of presentation embodied in the present invention, the invention further provides for the use of a plurality of discs, indicated at 14 and 15, operating in conjunction with the center opening 8 to thereby multiply the number of different announcements which it is possible to make through this sight opening. The structure by which this is accomplished is fully described below. A typical group of announcements which may be carried on the center discs is as follows: New Year's Day, Lincoln's Birthday, Washington's Birthday, Easter, Memorial Day, Independence Day, Labor Day, Columbus Day, Armistice Day, Thanksgiving Day, Christmas, During Summer After, During Summer Until, Election Day, Half Holiday, Local Holiday, National Holiday, Religious Holiday, State Holiday.

It is understood that the specific information carried by the respective discs, particularly the information on disc 10 and on the center discs, is merely illustrative of subject matter which is appropriate for an announcer intended for store use, or the like, and that the specific information presented at the various openings may be varied considerably without departing from the scope and spirit of the invention.

From the above it will be understood that the presentation made possible by the announcer of the present invention centers around the primary information which is presented at the centrally located sight opening 8 and is given the position of prominence on the announcer. The other surrounding sight openings announce certain desirable specific data associated with the primary announcements made in the central position. The construction of the article makes an exceedingly large amount of information available for presentation at the central opening, thereby and in like proportion increasing the usefulness and adaptability of the article as an announcer. It is an important object of the invention to provide an embodiment as shown and described which makes this type of presentation possible, namely the presentation wherein a primary announcement is purposely given a position of prominence for effect upon the reader, is supplemented by additional specific data detailed by other sight openings given a position of secondary importance, and presented in physical proximity to the primary central opening to clearly indicate the relation but sufficiently removed to be of somewhat secondary importance.

The construction by means of which the respective discs are mounted and secured so they can be rotated in proper position to the face plate 1 is indicated in Figures 2 to 4. Each disc is provided with an opening 16 at the position of its desired axis of rotation, and an eyelet 17 is introduced into the opening 16 and is rolled over as shown at the respective faces of the disc. This construction is intended primarily where the discs are of cardboard, or the like which might have a tendency to wear or tear out upon prolonged or rigorous use. Eyelet 17 thus serves as a bushing which prevents wear of the paper and gives it a much greater stability against tearing out. The second eyelet 18 passes through eyelet 17 and is rolled over as indicated at 19 at the face of plate 1. The cylindrical portion of the eyelet 18 between the rear face of the plate 1 and the flange 20 at the rear end of the eyelet constitutes a shaft upon which the disc rotates, the bearing contact being between the shaft portion of eyelet 18 and the eyelet 17. This constitutes a rugged durable construction and at the same time provides for easy and uniform operation of the discs. The discs rotate freely on the eyelets 18 but have sufficient stability to hold their positions when set by reason of their friction against the rear face of plate 1 and by reason of friction between the several discs. Furthermore, this construction is practicable and economical from a manufacturing standpoint. If desired, fiber sleeves or washers 22 may be provided as shown between eyelets 17 and 18 as bearing members.

The presentation of a great variety of information at the center opening, and the consequent ability of the announcer to adapt itself to all occasions, is made possible in an announcer of practicable size largely by the use of relatively large diameter discs at the central sight opening 8 and by the use of multiple discs at that point. Disc 14, which operates in conjunction with the center sight opening 8, is mounted with its axis of rotation adjacent to the sight opening substantially as shown. It will be noted that the disc can be made of large diameter to thereby carry a large amount of printed matter in relatively large size type without extending beyond the edges of face plate 1. The second disc 15, which cooperates with disc 14, is provided with a cut out sector 21, as shown, which is so arranged with respect to the axis of rotation of the disc and with respect to the position and size of disc 14 that disc 15 may be brought into position at sight opening 8 by moving it in front of disc 14. The process of effecting this operation is illustrated in Figure 2. In the drawings, as shown, disc 14 lies in front of disc 15 and the information appearing at sight opening 8 is that carried by disc 14. If disc 15 be rotated clockwise from the position shown in the drawings, continued rotation of the disc will result in interchanging the relative positions of the two discs so that disc 15 will then lie immediately adjacent sight opening 8, and the information on this disc will be presented at the sight opening.

It will be understood that certain modifications in construction and design and certain modifications in the particular information displayed can be made without departing from the scope of the invention. For instance, the word "closed" which, in the embodiment shown, is a part of the permanent inscription on the face plate 1 may be substituted by a sight opening and the sight opening may be provided with a cooperating disc carrying both the words "closed" and "open" if it is desired to specifically display the word "open" on certain occasions. Experience has demonstrated that it is ordinarily preferable to use the announcer to state a closing time, thereby implying that the establishment will be open at all other regular times. Also, various other information may be added to the discs operating behind sight openings 5 and 8 to conform to the particular requirements of any establishment. It will also be understood that blank spaces may be left on the discs operating in conjunction with sight openings 5 and 8 so that the user may letter or print in any particular inscription which he desires for some special occasion. Also, as a manufacturing operation, the disc can be printed specially to suit the requirments of any particular establishmenst without necessitating any change in the construction, design or arrangement of the article.

The invention is defined in the appended claims in terms of the novel and useful method of presentation effected by the announcer as herein disclosed, by the features of construction, design, combination and arrangement which make such presentation possible in a physical embodiment of the invention, and by certain improvements in construction and design which make for better operation, greater durability and generally enchanced utility of the device.

We claim:

1. In a visual announcer of the class described, means for presenting a great variety of information at a single sight opening which comprises a plurality of pivoted announcing members having spaced pivot points operating behind one sight opening, and means for interchanging the relative positions of said announcing members with respect to said sight opening to thereby present information carried by either of said members at substantially the same position relative to said sight opening.

2. In a visual announcer of the class described, an announcing disc bearing a plurality of visual inscriptions for presentation at a sight opening, means for adjusting said announcing disc to bring any desired one of said visual inscriptions into register with said sight opening, a second announcing disc also carrying a plurality of visual inscriptions and mounted at a point somewhat removed from said first disc but overlapping said first disc to a substantial extent and extending over said sight opening, said second disc having a cut-out sector of depth at least equal to the extent to which said discs overlap, whereby the relative positions of said discs with respect to said sight opening can be changed by passing the first disc through the cut-out sector portion of the second disc to thereby effect presentation at said sight opening of information carried by either disc.

In testimony whereof we affix our signatures.

HUGO L. RUSCH.
EDWIN R. LEIBERT.